(12) United States Patent
Ling et al.

(10) Patent No.: US 11,879,667 B1
(45) Date of Patent: Jan. 23, 2024

(54) ULTRA-SUPERCRITICAL TOWER-TYPE SOLAR HEAT ABSORBER

(71) Applicant: Nanjing Tech University, Nanjing (CN)

(72) Inventors: Xiang Ling, Nanjing (CN); Changtian Liu, Nanjing (CN); Ruiwen Zhou, Nanjing (CN); Bohou Huang, Nanjing (CN); Chong Cao, Nanjing (CN)

(73) Assignee: Nanjing Tech University, Nanjing (CN)

( * ) Notice: Subject to any disclaimer, the term of this patent is extended or adjusted under 35 U.S.C. 154(b) by 0 days.

(21) Appl. No.: 18/272,353

(22) PCT Filed: Mar. 1, 2022

(86) PCT No.: PCT/CN2022/078584
§ 371 (c)(1),
(2) Date: Jul. 14, 2023

(87) PCT Pub. No.: WO2023/133979
PCT Pub. Date: Jul. 20, 2023

(30) Foreign Application Priority Data

Jan. 13, 2022 (CN) .......................... 202210035771.9

(51) Int. Cl.
*F24S 10/70* (2018.01)
*F24S 10/30* (2018.01)
(Continued)

(52) U.S. Cl.
CPC ............... *F24S 10/72* (2018.05); *F24S 10/30* (2018.05); *F24S 70/10* (2018.05); *F24S 70/60* (2018.05); *F24S 80/20* (2018.05)

(58) Field of Classification Search
None
See application file for complete search history.

(56) References Cited

U.S. PATENT DOCUMENTS 4,289,114 A * 9/1981 Zadiraka ................. F24S 20/20
126/587
4,296,730 A * 10/1981 Zadiraka ................. F24S 20/20
126/643

(Continued)

FOREIGN PATENT DOCUMENTS

| CN | 102445008 A | 5/2012 |
| CN | 102927697 A | 2/2013 |

(Continued)

*Primary Examiner* — Jorge A Pereiro
(74) *Attorney, Agent, or Firm* — Bayramoglu Law Offices LLC (57) ABSTRACT

An ultra-supercritical (USC) tower-type solar heat absorber includes a grille-hot-plate current-sharing screen, a tube row, and a graphite filling layer. The grille-hot-plate current-sharing screen is assembled by a plurality of grille hot plates. Each of the plurality of grille hot plates includes a liquid-absorbing core and a grille, and is filled with a phase-transition working medium (such as sodium, potassium, and lithium) and pumped to a vacuum state. When sunlight is reflected and concentrated on the grille-hot-plate current-sharing screen, the phase-transition working medium absorbs heat and evaporates on an evaporation surface of a grille hot plate, is condensed on a condensation surface of the grille hot plate, and returns to the liquid-absorbing core through a grille to produce a stable two-phase flow, which allows efficient heat transfer, homogenizes a surface heat-flow density, and greatly reduces a temperature difference and a thermal stress on a surface of the grille-hot-plate current-sharing screen.

9 Claims, 6 Drawing Sheets

(51) Int. Cl.
*F24S 80/20* (2018.01)
*F24S 70/60* (2018.01)
*F24S 70/10* (2018.01)

(56) References Cited

U.S. PATENT DOCUMENTS

| | | | | |
|---|---|---|---|---|
| 4,485,803 A * | 12/1984 | Wiener | ............... | F03G 6/065 |
| | | | | 126/591 |
| 2007/0056714 A1 * | 3/2007 | Wong | ............... | H01L 23/427 |
| | | | | 257/E23.088 |
| 2009/0260785 A1 * | 10/2009 | Wang | ............... | F28D 15/046 |
| | | | | 165/170 |
| 2010/0065255 A1 * | 3/2010 | Liu | ............... | F28D 15/046 |
| | | | | 165/104.33 |
| 2010/0314081 A1 * | 12/2010 | Reis | ............... | F28F 21/02 |
| | | | | 165/134.1 |
| 2011/0209697 A1 * | 9/2011 | Plotkin | ............... | F24S 10/742 |
| | | | | 165/173 |
| 2015/0122244 A1 * | 5/2015 | Bain | ............... | F24S 25/50 |
| | | | | 126/643 |
| 2017/0010023 A1 | 1/2017 | Slocum et al. | | |
| 2018/0073814 A1 * | 3/2018 | Zhou | ............... | F28D 15/0233 |

FOREIGN PATENT DOCUMENTS

| | | |
|---|---|---|
| CN | 204128216 U | 1/2015 |
| CN | 105157243 A | 12/2015 |
| CN | 105634404 A | 6/2016 |
| CN | 106052159 A | 10/2016 |
| CN | 108489122 A | 9/2018 |
| CN | 112856832 A | 5/2021 |
| CN | 213741687 U | 7/2021 |
| KR | 100804183 B1 | 2/2008 |
| WO | 2013106901 A1 | 7/2013 |
| WO | 2013181712 A1 | 12/2013 |

* cited by examiner

ULTRA-SUPERCRITICAL TOWER-TYPE SOLAR HEAT ABSORBER

CROSS REFERENCE TO THE RELATED APPLICATIONS

This application is the national phase entry of International Application No. PCT/CN2022/078581, filed on Mar. 1, 2022, which is based upon and claims priority to Chinese Patent Application No. 202210035771,9, filed on Jan. 13, 2022, the entire contents of which are incorporated herein by reference.

TECHNICAL FIELD

The present disclosure belongs to the technical field of utilization of solar high-temperature heat, and specifically relates to an ultra-supercritical (USC) tower-type solar heat absorber.

BACKGROUND

In recent years, China has become the largest energy producer and consumer worldwide, and the dependence of social development on energy has increased unprecedentedly. However, traditional energy sources (such as fossil fuels) are non-renewable, and reserves of these energy sources in the nature are limited. Environmental problems (such as greenhouse effect and haze formation) caused by consumption of traditional fossil fuels are seriously threatening the harmonious and healthy development of the nature and human society. Solar energy has attracted extensive attention due to characteristics such as versatility, renewability, cleanliness, and high energy. Concentrated solar power (CSP) is considered as one of the technologies that are most likely to replace the traditional kerosene power generation, where a tower-type solar power generation system features high adaptability for high temperatures, high photothermal conversion efficiency, and high concentration ratio, and has promising prospects. However, a heat absorber, as a key component of the tower-type solar power generation system, is prone to problems such as thermal fatigue and thermal ratchet due to uneven heating and local overheating of a heat-absorbing surface under an uneven and high-energy flow density action. Therefore, how to ensure a stable and efficient operation of a heat absorber has become a key technical problem for the current tower-type solar power generation systems.

SUMMARY

In view of the shortcomings of the prior art, the present disclosure provides an USC tower-type solar heat absorber. The USC tower-type solar heat absorber has high photothermal conversion efficiency and high heat-exchange efficiency, is easy to arrange, can well withstand a thermal load and a thermal shock under a high heat-flow density, and can solve the problem that the existing flat-plate heat absorber is prone to problems such as thermal fatigue and thermal ratchet due to uneven heating and local overheating of a heating surface.

To achieve the above objective, the present disclosure adopts the following technical solutions:

An USC tower-type solar heat absorber is provided, including: a plurality of grille-hot-plate current-sharing screens, a plurality of tube rows, and a graphite filling layer, where each of the plurality of grille-hot-plate current-sharing screens is assembled by a plurality of grille hot plates independent of each other; and when sunlight is reflected and concentrated on the plurality of grille-hot-plate current-sharing screens, heat transfer is allowed by a phase transition of a phase-transition working medium inside the grille hot plates, and heat is transferred through the graphite filling layer to the plurality of tube rows embedded in the graphite filling layer and taken away by a heat-transfer medium flowing through the plurality of tube rows.

In order to optimize the above technical solution, the present disclosure further adopts the following specific measures:

Further, each of the plurality of grille hot plates includes a heat-absorbing plate, a metal fiber felt, a metal wire mesh, a grille, a sealing plate, and an intermediate partition plate; the metal fiber felt, the metal wire mesh, the grille, and the intermediate partition plate are sequentially arranged on an evaporation surface of the heat-absorbing plate; the metal fiber felt is tightly attached to the evaporation surface of the heat-absorbing plate, and the metal wire mesh covers a surface of the metal fiber felt; the metal fiber felt, and the metal wire mesh together constitute a liquid-absorbing core; the grille is directly connected to a condensation surface of the intermediate partition plate, and extends obliquely to the metal wire mesh; and the grille hot plate is enclosed by the sealing plate, filled with the phase-transition working medium, and pumped to a vacuum state.

Further, the metal wire mesh and the metal fiber felt are spot-welded on the evaporation surface of the heat-absorbing plate, and the grille is directly connected to the intermediate partition plate through three-dimensional (3D) printing.

Further, the grille includes a plurality of V-shaped grids evenly distributed on the intermediate partition plate, and a longitudinal section of each of the plurality of V-shaped grids is V-shaped; each of the plurality of V-shaped grids has a predetermined inclination angle relative to a horizontal plane, such that the phase-transition working medium is allowed to be condensed and returned to the liquid-absorbing core through the grille; and a gap is formed among the plurality of V-shaped grids.

Further, the phase-transition working medium is liquid metal sodium, liquid metal potassium, liquid metal lithium, or a liquid metal alloy.

Further, each of the plurality of grille-hot-plate current-sharing screens corresponds to one tube row; and heat is transferred through the graphite filling layer to each tube row embedded in the graphite filling layer to produce an USC superheated steam.

Further, each of the plurality of tube rows includes a preheating tube row and a mixing tube row; the preheating tube row includes a plurality of preheating pipelines, and the mixing tube row includes a plurality of preheating pipelines and a plurality of overheating pipeline that are arranged at a predetermined interval; and water under an USC pressure passes first through preheating pipelines of the plurality of mixing tube rows sequentially and then through preheating pipelines of the plurality of preheating tube rows sequentially to produce saturated steams, the saturated steams are gathered in a main pipeline and then introduced through the main pipeline into overheating pipelines of the plurality of mixing tube rows to be superheated, and USC superheated steams generated by the overheating pipelines of the plurality of mixing tube rows are gathered and output.

Further, in the mixing tube row, the plurality of preheating pipelines and the plurality of overheating pipeline are arranged in a heat-carrying compensation manner, such that each overheating pipeline is compensated by a preheating pipeline next to the overheating pipeline, where a diameter of the overheating pipeline is greater than a diameter of the preheating pipeline.

Further, the plurality of tube rows are made of T22 steel, T23 steel, or 12Cr1MoVG steel.

Further, the graphite filling layer is filled between the tube rows and the grille hot plates and between the tube rows and an inner tubular wall of the USC tower-type solar heat absorber, and the graphite filling layer is made of a graphite powder or a graphite mixture.

The present disclosure has the following beneficial effects:

1) Liquid metal sodium, potassium, or lithium or a related ahoy can be adopted as a phase-transition working medium. The liquid metal sodium has characteristics such as wide operating temperature range, low viscosity, and high heat transfer efficiency, and can operate at a high heat-flow density, which improves the heat transfer performance of the heat absorber; and the liquid metal sodium has a low melting point, resulting in quick start. In addition, a hot plate structure has a poorer pressure-bearing capacity than a tubular structure, and this requirement can be met by a low metal sodium saturated steam pressure.

2) Based on the principle of efficient heat transfer of heat tubes, an indirect heat transfer manner is adopted to avoid direct sunlight irradiation, which avoids the problems such as thermal fatigue and thermal ratchet caused by a thermal stress of direct heat transfer, and well prolongs a service life of the grille hot plate.

3) Through cooperation of a returning effect of a V-shaped grid grille and a capillary effect of a liquid-absorbing core, a condensed and returned liquid phase-transition working medium can be evenly distributed on an evaporation surface of a heat-absorbing plate, such that a heat-absorbing surface has excellent isothermal performance, which avoids problems caused by local overheating and further prolongs a service life of a grille hot plate. The design of the grille allows unitization of large-space evaporation and condensation cycles, increases a condensation heat transfer area, shortens a condensation return pathway of the liquid phase-transition working medium, and greatly improves the uniform temperature performance of the grille hot plate.

4) A graphite powder or a graphite mixture is filled between the tube row and the grille-hot-plate current-sharing screen and between the tube row and an inner tubular wall. Due to characteristics such as high temperature resistance and high thermal conductivity coefficient, graphite can stably strengthen a heat exchange effect; and because graphite has excellent adhesion to a metal surface, a tube can be effectively prevented from being oxidized.

5) The heat absorber structure provided in the present disclosure can heat water to an USC state, which greatly improves the operating parameters and power generation efficiency. In addition, the grille hot plates are easily standardized, and the grille hot plates are separate components, do not interfere with each other when working, and can he repaired and replaced separately, resulting in excellent safety performance and easy maintenance and disassembly.

Reference numerals: 1: grille-hot-plate current-sharing screen; 1,1: heat-absorbing plate; 1.2: metal fiber felt; 1.3: metal wire mesh; 1,4: grille; 1.4.1: V-shaped grid; 1,5: sealing plate; 1.6: intermediate partition plate; 2: tube row; 2.1: preheating pipeline; 2.2: preheating-tube main pipeline branch tube; 2,3: overheating-tube main pipeline branch tube; 2,4: overheating pipeline; 3: graphite filling layer; and 4: inner tubular wall.

DETAILED DESCRIPTION OF TRE EMBODIMENTS

The present disclosure is described in further detail below with reference to the accompanying drawings.

Figure 1:
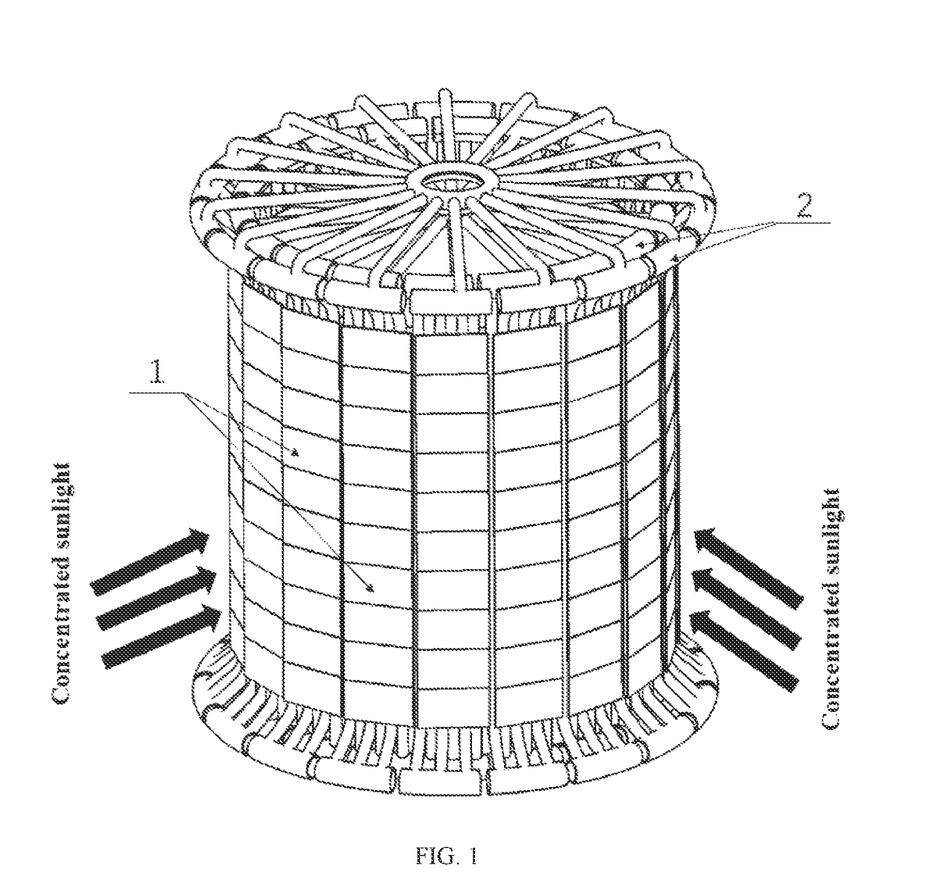
FIG. 1 is an outline diagram of the USC tower-type. solar heat absorber of the present disclosure.
Figure 4:
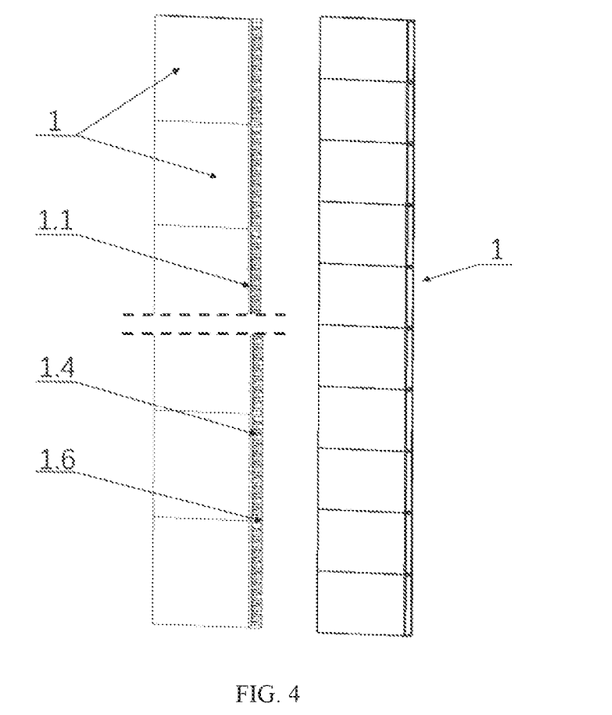
FIG. 4 is a longitudinal section view of the grille-hot-plate current-sharing screen of the present disclosure.

As shown in FIG. 1 and FIG. 4, an USC tower-type solar heat absorber is provided, including: grille-hot-plate current-sharing screen 1, tube row 2, and graphite filling layer 3. The grille-hot-plate current-sharing screen 1 is assembled by a plurality of grille hot plates, and concentrated sunlight is irradiated on a grille hot plate of the grille-hot-plate current-sharing screen 1. Based on the principle of efficient heat transfer of heat tubes, the grille hot plate has characteristics such as rapid response, excellent heat transfer performance, superior isothermal performance, and high stability, and in combination with an indirect heat transfer manner, the grille hot plate can effectively solve the problems such as thermal stress and thermal fatigue caused by a huge temperature difference due to direct heat transfer.

Figure 2:
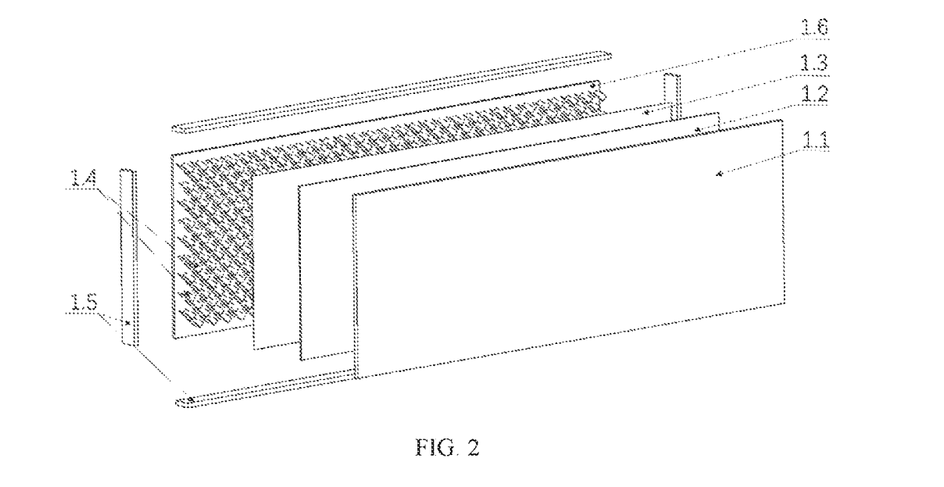
FIG. 2 is an exploded view of the grille hot plate of the present disclosure.

As shown in FIG. 1 and FIG. 2, during a working process, high heat-flow density solar energy gathered by a heliostat is irradiated on heat-absorbing plate 1.1 of the grille hot plate, and because an outer surface of the heat-absorbing plate 1.1 is coated with a high temperature-resistant light-absorbing coating, heat is transferred to an inside of the grille hot plate through heat absorption and heating of the heat-absorbing plate 1.1; and liquid metal sodium (or liquid metal potassium or lithium or a related alloy) absorbs the heat and evaporates, then is condensed on a condensation surface of intermediate partition plate 1.6 to release a large amount of heat, and then returns through an inclination direction of grille 1.4 to metal fiber felt 1.2 and metal wire mesh 1.3 to produce a stable two-phase flow, such as to allow efficient phase-transition heat transfer. In addition, a capillary effect of the metal fiber felt 1.2 can make condensed and returned liquid metal sodium evenly distributed on an inner wall surface (namely, an evaporation surface) of the heat-absorbing plate 1.1, homogenize a heat-flow density on a surface of the grille-hot-plate current-sharing screen 1, and greatly reduce a temperature difference of a surface of the grille-hot-plate current-sharing screen 1, such that a heat-absorbing surface of the grille hot plate has excellent isothermal performance to reduce a damage of a thermal stress caused by uneven heating to the heat absorber. The heat released by condensation is continuously transferred to the graphite filling layer 3 through the intermediate partition plate 1.6, then transferred to the tube row 2 embedded in the graphite filling layer 3, and then taken away by a heat-transfer medium, As shown in FIG. 2, the grille hot plate includes the heat-absorbing plate 1.1, the metal fiber felt 1.2, the metal wire mesh 1.3, the grille 1,4, sealing plate 1.5, the intermediate partition plate 1.6, and the liquid metal sodium, where the metal fiber felt 1.2 is tightly attached to an inner surface of the heat-absorbing plate 1,1, the metal wire mesh 1.3 covers the metal fiber felt 1.2, and the metal wire mesh 1,3 and the metal fiber felt 1.2 are spot-welded on the inner surface of the heat-absorbing plate 1.1 through a nickel sheet; and the grille 1.4 is directly connected to a condensation surface of the intermediate partition plate 1.6 through 3D printing, and extends obliquely to the metal wire mesh 1.3. A phase transition process of liquid metal sodium can quickly transfer a large amount of heat, and liquid metal sodium has characteristics such as wide operating temperature range, low viscosity, low melting point, high boiling point, high heat transfer efficiency, and low saturated steam pressure. The phase-transition working medium can also be replaced by potassium, lithium, or a related alloy, and is filled in a volume 40% of a volume of the grille hot plate under working conditions. In addition, an inside of the grille hot plate is in a vacuum state, which can avoid problems such as oxidation of materials inside the grille hot plate.

As shown in FIG. 2, materials of the heat-absorbing plate 1.1, the metal fiber felt 1.2, the metal wire mesh 1.3, the grille 1.4, the sealing plate 1.5, and the intermediate partition plate 1.6 all are materials such as stainless steel or high-temperature nickel-based alloys compatible with metal sodium. A liquid metal has a high boiling temperature and excellent heat transfer performance, and is allowed to operate at a high heat-flow intensity, but has compatibility requirements for a packaging material.

Figure 3:
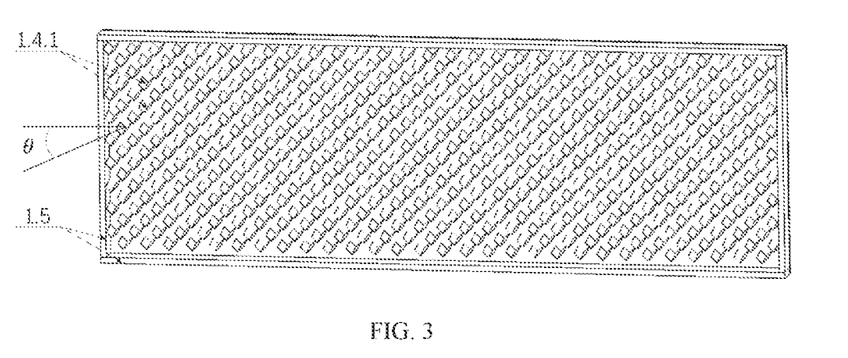
FIG. 3 is an outline diagram of a grille in the grille hot plate of the present disclosure.

As shown in FIG. 2 and FIG. 3, the grille 1.4 includes a plurality of V-shaped grids 1.4.1 with a predetermined inclination angle; and a longitudinal section of each V-shaped grid 1.4.1 is V-shaped, and symmetrical rectangular sheet structures are provided at two sides, such that the V-shaped grid is like an open book page as a whole. The V-shaped grid 1.4.1 has a predetermined inclination angle θ (10° to 20°) relative to a horizontal plane, and a gap is formed among the V-shaped grids 1.4.1, such that the V-shaped grids communicate with each other, and a vaporized phase-transition working medium can flow quickly and freely inside the grille hot plate. The grille hot plate is enclosed and fixed by the sealing plate 1.5. The inclination angle is designed to make condensed liquid sodium quickly return to the liquid-absorbing core (including the metal fiber felt 1.2 and the metal wire mesh 1.3) under a gravity action, and the V-shaped grids 1.4.1 are designed to make a sodium steam in each V-shaped grid 1.4.1 undergo countless micro-heat tube cycles and make the lateral flow resistance of a V-shaped flow channel small. The unitization of large-space evaporation and condensation cycles increases a condensation heat transfer area, and shortens a condensation and returning pathway of liquid sodium, such that condensed and returned liquid sodium can be evenly distributed on the liquid-absorbing core, which significantly improves the isothermal performance of the heat-absorbing plate 1.1.

Figure 5:
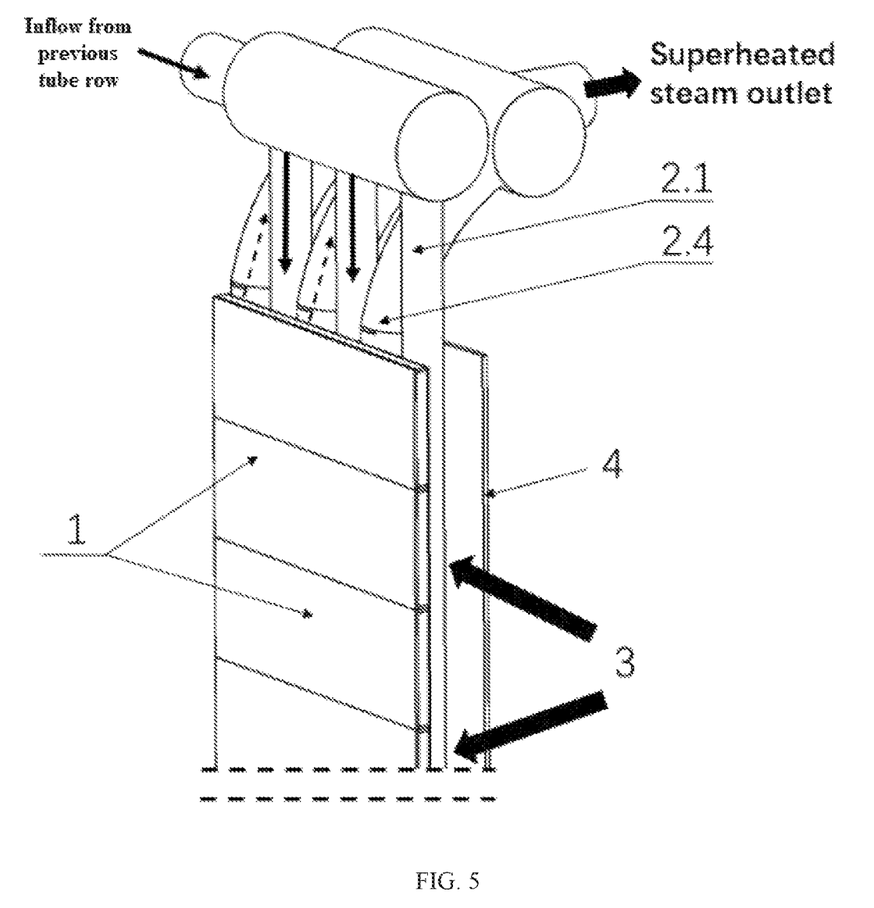
FIG. 5 is a schematic diagram illustrating the filling of a gap by graphite in the present disclosure.

As shown in FIG. 4 and FIG. 5, the grille-hot-plate current-sharing screen 1 includes a plurality of grille hot plates; each grille-hot-plate current-sharing screen 1 corresponds to one tube row 2; and graphite is filled between the grille-hot-plate current-sharing screen 1 and the tube row 2 and between the grille-hot-plate current-sharing screen 1 and the inner tubular wall 4. A high thermal conductivity coefficient of graphite can enhance a heat exchange effect of a heat-transfer medium in preheating pipeline 2.1 and overheating pipeline 2.4; and the excellent adhesion of graphite to a metal surface can effectively prevent a tube from being oxidized.

Figure 6:
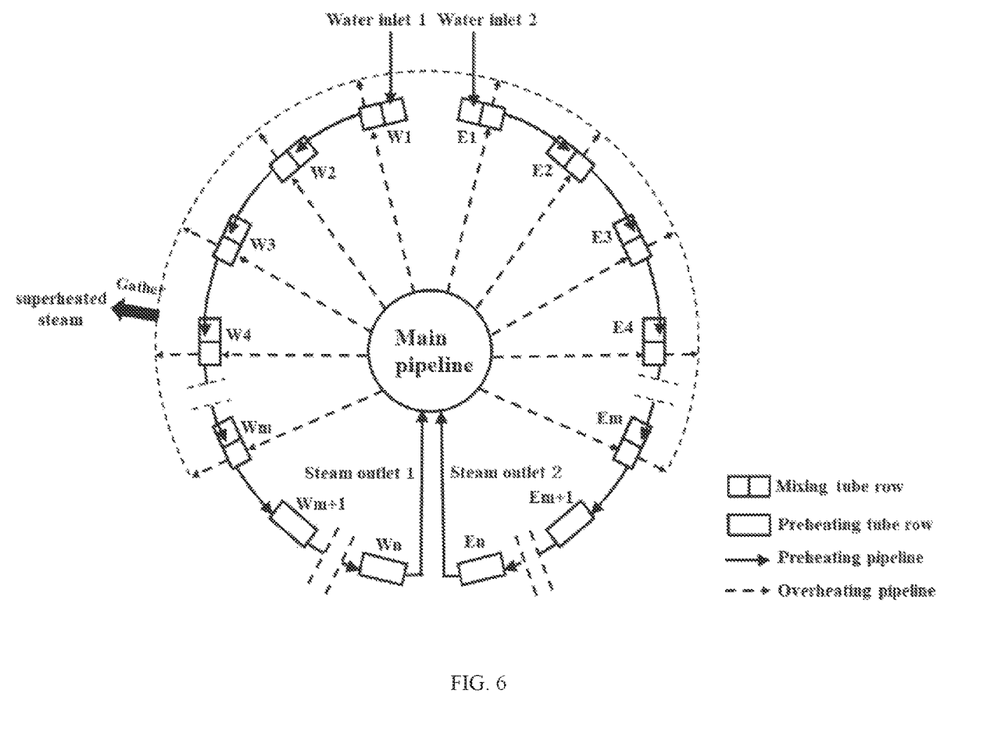
FIG. 6 is a schematic diagram illustrating tube flows of the USC tower-type solar power system of the present disclosure.
Figure 7:
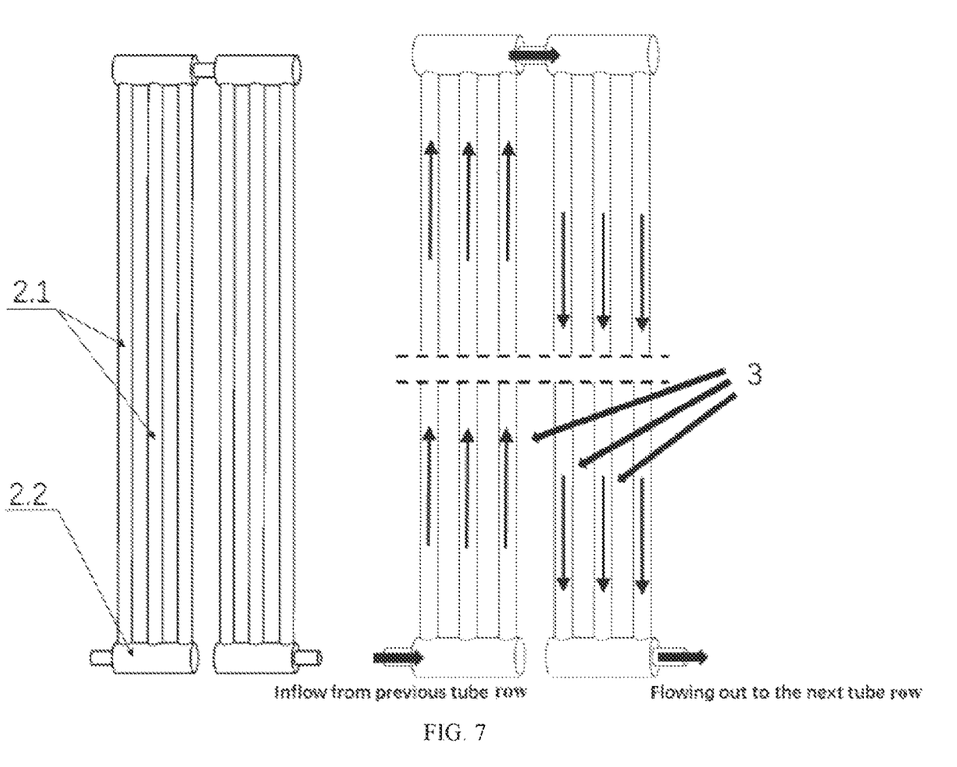
FIG. 7 is a schematic diagram illustrating flow directions of the preheating tube row of the present disclosure.
Figure 8:
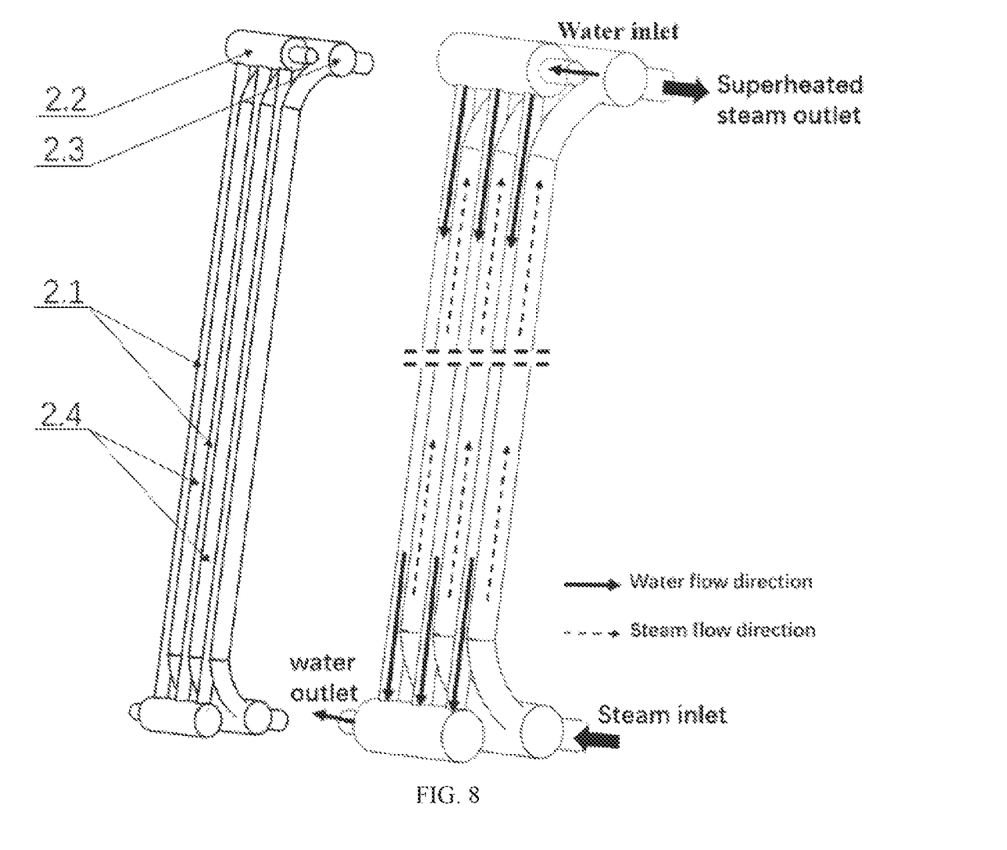
FIG. 8 is a schematic diagram illustrating the heat-carrying compensation arrangement of the mixing tube row of the present disclosure.

As shown in FIG. 6, FIG. 7, and FIG. 8, the tube row 2 includes preheating pipeline 2.1, overheating pipeline 2.4, a main pipeline, and a heat-transfer medium. According to different functions, the tube row 2 includes a preheating tube row and a mixing tube row, the preheating tube row includes a plurality of preheating pipelines 2.1, and the mixing tube row includes a plurality of preheating pipelines 2.1 and a plurality of overheating pipeline 2.4. All preheating pipelines are connected in series. Water flows from a previous tube row to the next tube row, and after water passes through a plurality of tube rows, saturated steams in a supercritical state are produced and gathered in the main pipeline, and then introduced into overheating pipeline 2.4 of each mixing tube row to be superheated. Because a superheated steam has a weak heat-carrying capacity, the overheating pipeline 2.4 and the preheating pipelines 2.1 are arranged in a heat-carrying compensation manner, such that each of left and right sides of each overheating pipeline 2.4 is provided with a preheating pipeline 2.1 for compensation. The heat-transfer medium is water under an USC pressure, and because water has a large specific heat capacity and a strong heat-transfer capacity, a high-pressure water pump is used to increase a pressure of water to the USC pressure (27 MPa or more). When water passes through the plurality of tube rows to produce saturated steams, the heat-carrying capacity decreases, and a temperature of the overheating pipeline 2.4 increases sharply, which easily causes burst and other dangers to the overheating pipeline 2.4. The heat-carrying compensation arrangement can effectively make up for this shortcoming. The overall tightness and materials of tubes of the system need to meet very strict standards, and the tube row 2 is made of a high temperature-resistant pressure-bearing material such as T22 steel, 123 steel, or 12Cr1MoVG steel.

In a specific embodiment shown in an accompanying drawing, each preheating tube row includes three preheating pipelines 2.1, and each mixing tube row includes three preheating pipelines 2.1 and three overheating pipeline 2.4; and a specific number of tubes can be increased or decreased according to actual needs. A pressure of water is increased by a high-pressure water pump to an USC pressure, and water under the USC pressure first enters preheating pipelines 2.1 of an $m^{th}$ mixing tube row and then flows to preheating pipelines 2.1 in a corresponding preheating tube row; after passing through a total of n tube rows 2, the water under the USC pressure is converted into saturated steams, and the saturated steams are gathered in the main pipeline; and the gathered saturated steam is introduced through the main pipeline into overheating pipeline connected in parallel and superheated to produce USC superheated steams, and the USC superheated steams are gathered and output to drive the power generation of a steam turbine.

As shown in FIG. 7, in each preheating tube row; three preheating pipelines 2.1 are arranged between upper and lower two preheating-tube main pipeline branch tubes 2.2, where the preheating-tube main pipeline branch tube 2.2 at one side is configured to receive an inflow from a previous tube row, and the preheating-tube main pipeline branch tube 2.2 at the other side is configured to allow an outflow into the next tube row; and the preheating tube rows are connected in series.

As shown in FIG. 8, in each mixing tube row, three preheating pipelines 2.1 are arranged between upper and lower two preheating-tube main pipeline branch tubes 2.2, where one preheating-tube main pipeline branch tube 2.2 at one side serves as a water inlet, and the other preheating-tube main pipeline branch tube 2.2 at the other side serves as a water outlet; and three overheating pipeline 2.4 are arranged between upper and lower two overheating-tube main pipeline branch tubes 2,3, where one overheating-tube main pipeline branch tube 2.3 at one side serves as a steam inlet such that a steam flows in through the main pipeline, and the other overheating-tube main pipeline branch tube 2.3 at the other side serves as a superheated steam outlet, In the mixing tube row, the preheating pipelines 2.1 and the overheating pipeline 2.4 are arranged in a heat-carrying compensation manner, and the preheating pipelines 2.1 and the overheating pipeline 2.4 are arranged at a predetermined interval. When a produced saturated steam enters the overheating pipeline 2.4 and is superheated, a volume of the saturated steam expands sharply, and a temperature of the saturated steam increases rapidly. In order to prevent burst of the overheating pipeline 2.4, the heat-carrying compensation arrangement is adopted, and a diameter of the overheating pipeline 2.4 is much larger than a diameter of the preheating pipeline 2.1.

As shown in FIG. 5, FIG. 7, and FIG. 8, a graphite powder or a graphite mixture is filled in a gap between the preheating pipeline 2.1 and the overheating pipeline 2.4, and graphite and a high-temperature thermally-conductive adhesive are mixed and filled in gaps among each grille-hot-plate current-sharing screen 1, each tube row 2, and the inner tubular wall 4 for packaging. Graphite has a high thermal conductivity coefficient, which can stably enhance a heat exchange effect of a heat-transfer medium in the plurality of preheating pipelines 2.1 and overheating pipeline 2.4; and graphite has excellent adhesion to a metal surface, which can effectively prevent the plurality of preheating pipelines 2.1 and overheating pipeline 2.4 from being oxidized.

As shown in FIG. 1, the grille hot plates in each grille-hot-plate current-sharing screen I are separate heat-absorbing elements, can work separately without affecting each other, and can be disassembled and replaced separately when damaged and repaired; and the grille-hot-plate current-sharing screens 1 also do not affect each other, which allows excellent safety and stability performance during working and greatly reduces a maintenance cost.

In summary, in the present disclosure, based on the principle of efficient heat transfer of heat tubes, an indirect heat transfer manner is adopted, and a phase-transition working medium undergoes micro-heat tube cycles in a grille of a grille hot plate, such that a condensed and returned phase-transition working medium is evenly distributed on the evaporation surface of the heat-absorbing plate, and a heat-absorbing surface of a grille hot plate has excellent isothermal performance and can withstand a thermal load under a high heat-flow density, which can prevent the problems such as thermal fatigue caused by local overheating and prolong a service life of the heat absorber. Like other types of solar heat absorbers, the heat absorber of the present disclosure adopts the principle of phase-transition heat transfer, except that high-temperature liquid metal sodium, potassium, or lithium or a related alloy is adopted as a phase-transition working medium inside the heat absorber. Heat is transferred through a phase transition of liquid metal sodium to the graphite filling layer, then further transferred to the tube rows embedded in the graphite, and then taken away by a heat-transfer medium (water) flowing through the tube rows, which avoids direct sunlight irradiation to provide heat and further avoids uneven heating. In the present disclosure, it is designed to adopt a gap filling method, where graphite is filled in gaps among tube rows. Graphite has a high thermal conductivity coefficient, which can further enhance a heat exchange effect of a heat-transfer medium in a preheating pipeline and an overheating pipeline; and graphite has excellent adhesion to a metal surface, which can effectively prevent a tube from being oxidized. The heat absorber structure can heat water to an USC state, which greatly improves the operating parameters and power generation efficiency.

It should be noted that, as used herein, terms such as "upper", "lower", "left", "right", "front", and "back" are merely used for ease of description, and are not intended to limit the implementable scope of the present disclosure, and a change or adjustment of its relative relation shah also be deemed as falling within the implementable scope of the present disclosure without substantially changing the technical content.

The above are only preferred implementations of the present disclosure, and the protection scope of the present disclosure is not limited thereto. All technical solutions based on the idea of the present disclosure should fall within the protection scope of the present disclosure. It should be noted that several modifications and improvements made by those of ordinary skill in the art without departing from the principle of the present disclosure should fall within the protection scope of the present disclosure.

What is claimed is:

1. An ultra-supercritical (USC) tower-type solar heat absorber, comprising: a plurality of grille-hot-plate current-sharing screens, a plurality of tube rows, and a graphite filling layer, wherein each of the plurality of grille-hot-plate current-sharing screens is assembled by a plurality of grille hot plates independent of each other; and when sunlight is reflected and concentrated on the plurality of grille-hot-plate current-sharing screens, heat transfer is allowed by a phase transition of a phase-transition working medium inside the grille hot plates, and heat is transferred through the graphite filling layer to the plurality of tube rows embedded in the graphite filling layer and taken away by a heat-transfer medium flowing through the plurality of tube rows;

each of the plurality of grille hot plates comprises a heat-absorbing plate, a metal fiber felt, a metal wire mesh, a grille, a sealing plate, and an intermediate partition plate; wherein the metal fiber felt, the metal wire mesh, the grille, and the intermediate partition plate are sequentially arranged on an evaporation surface of the heat-absorbing plate; the metal fiber felt is tightly attached to the evaporation surface of the heat-absorbing plate, and the metal wire mesh covers a surface of the metal fiber felt, the metal fiber felt and the metal wire mesh together constitute a liquid-absorbing core; the grille is directly connected to a condensation surface of the intermediate partition plate and extends obliquely to the metal wire mesh and the grille hot plate is enclosed by the sealing plate, filled with the phase-transition working medium, and pumped to a vacuum state.

2. The USC tower-type solar heat absorber according to claim 1, wherein the metal wire mesh and the metal fiber felt are spot-welded on the evaporation surface of the heat-absorbing plate, and the grille is directly connected to the intermediate partition plate through three-dimensional (3D) printing.

3. The USC tower-type solar heat absorber according to claim 1, wherein the grille comprises a plurality of V-shaped grids evenly distributed on the intermediate partition plate, and a longitudinal section of each of the plurality of V-shaped grids is V-shaped; each of the plurality of V-shaped grids has a predetermined inclination angle relative to a horizontal plane, such that, the phase-transition working medium is allowed to be condensed and returned to the liquid-absorbing core through the grille; and a gap is formed among the plurality of V-shaped grids.

4. The USC tower-type solar heat absorber according to claim 1, wherein the phase-transition working medium is liquid metal sodium, liquid metal potassium, liquid metal lithium, or a liquid metal alloy.

5. The USC tower-type solar heat absorber according to claim 1, wherein each of the plurality of grille-hot-plate current-sharing screens corresponds to one tube row; and heat is transferred through the graphite filling layer to each tube row embedded in the graphite filling layer to produce an USC superheated steam.

6. The USC tower-type solar heat absorber according to claim 5, wherein each of the plurality of tube rows comprises a preheating tube row and a mixing tube row; the preheating, tube row comprises a plurality of preheating pipelines, and the mixing tube row comprises a plurality of preheating pipelines and a plurality of overheating pipeline that are arranged at a predetermined interval; and water under an USC pressure passes first through preheating pipelines of the plurality of mixing tube rows sequentially and then through preheating pipelines of the plurality of preheating tube rows sequentially to produce saturated steams, the saturated steams are gathered in a main pipeline and then introduced through the main pipeline into overheating pipelines of the plurality of mixing tube rows to be superheated, and USC superheated steams generated by the overheating pipelines of the plurality of mixing tube rows are gathered and output.

7. The USC tower-type solar heat absorber according to claim 6, wherein in the mixing tube row, the plurality of preheating pipelines and the plurality of overheating pipeline are arranged in a heat-carrying compensation manner, such that each overheating pipeline is compensated by a preheating pipeline next to the overheating pipeline, wherein a diameter of the overheating pipeline is greater than a diameter of the preheating pipeline.

8. The USC tower-type solar heat absorber according to claim 1, wherein the plurality of tube rows are made of T22 steel, T23 steel, or 12Cr1MoVG steel.

9. The USC tower-type solar heat absorber according to claim 1, wherein the graphite filling layer is filled between the tube rows and the grille hot plates and between the tube rows and an inner tubular wall of the USC tower-type solar heat absorber, and the graphite filling layer is made of a graphite powder or a graphite mixture.

* * * * *